P. MUSSLEMAN.
BRAKE ACTUATING MECHANISM.
APPLICATION FILED AUG. 9, 1907.
918,463.
Patented Apr. 13, 1909.
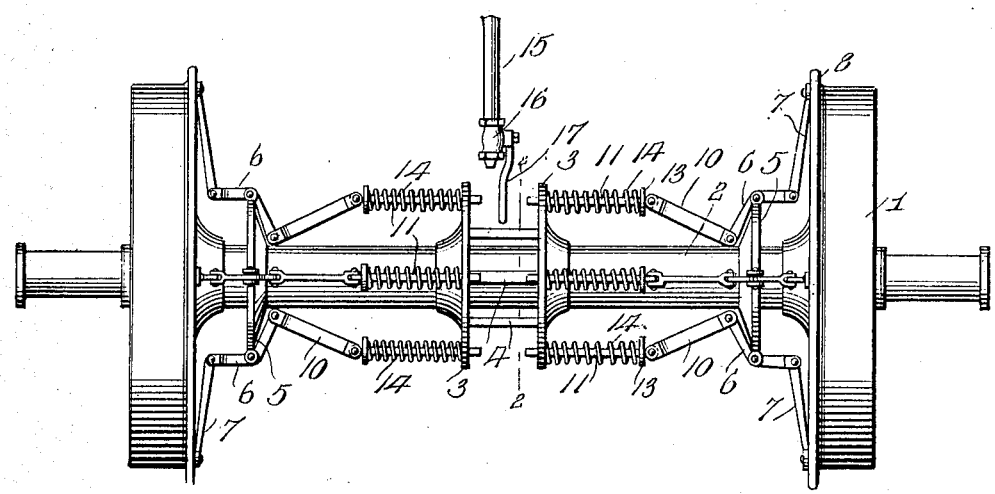
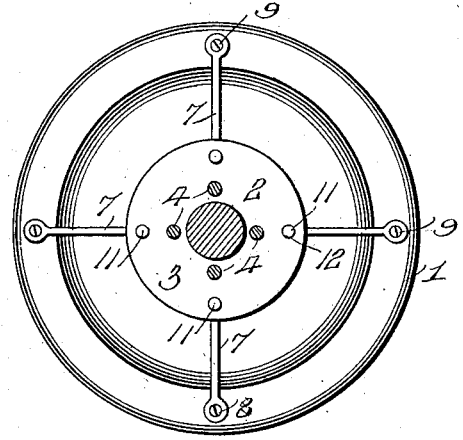
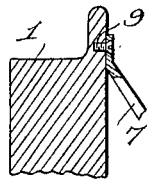
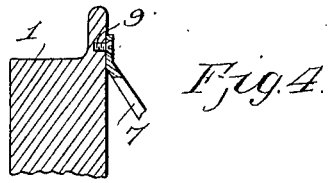
Witnesses
Frank Hough
D. W. Gould
Inventor
Patrick Mussleman
By Victor J. Evans
Attorney

UNITED STATES PATENT OFFICE.

PATRICK MUSSLEMAN, OF FORT SPRING, WEST VIRGINIA, ASSIGNOR OF ONE-HALF TO MOORE C. HINTON, OF HINTON, WEST VIRGINIA.

BRAKE-ACTUATING MECHANISM.

No. 918,463.      Specification of Letters Patent.      Patented April 13, 1909.

Application filed August 9, 1907. Serial No. 387,894.

*To all whom it may concern:*

Be it known that I, PATRICK MUSSLEMAN, a citizen of the United States, residing at Fort Spring, in the county of Greenbrier and State of West Virginia, have invented new and useful Improvements in Brake-Actuating Mechanism, of which the following is a specification.

The invention relates to an improvement in brake actuating mechanism, comprehending specifically a means whereby the air brakes of a train or the like may be automatically set in the event of the happening of certain contingencies, as the breaking of a wheel flange or the bending of the axle.

The main object of the present invention is the production of mechanism designed to be applied to the axle and car wheels of an ordinary passenger coach or the like, and the disposition of a bleed flange of the train pipe adjacent said mechanism, the mechanisms being so arranged as to be normally maintained in a position to avoid affecting said bleed flange, the construction providing that upon operation of the mechanism through the breaking of a flange or the opening of the axle certain parts of said mechanism will be projected into a position to operate the bleed valve and set the brakes.

The invention will be described in the following specification, reference being had particularly to the accompanying drawings, in which:—

Figure 1 is a view in front elevation illustrating the application of my invention to a car axle and the wheel thereon, Fig. 2 is a section on line 2—2 of Fig. 1, Fig. 3 is a perspective view of the lever construction forming part of said mechanism, Fig. 4 is an enlarged broken sectional view illustrating the attachment of the mechanism to the flange of the car wheel.

Referring particularly to the drawings, my improved automatic brake setting mechanism is adapted for connection to the track wheels 1 of a passenger coach or other vehicle, said wheels being as usual fixed upon an axle 2.

Secured upon the axle in spaced relation are disks 3, said disks being arranged equidistant on opposite sides of the central point of the axle and being of materially less diameter than the diameter of the wheels 1. The disks 3 are projected in exact parallel relation and are, of course, concentric with the axle 2, being connected by a series of transversely disposed rods 4, arranged in a concentric row about the axle 3 and comparatively close to the surface of said axle, as clearly shown in Fig. 2. The rods 4 extend in parallel relation with the axle and serve as one means for operating the bleed valve to be described.

Secured upon the axle 2 adjacent each wheel 1 is a supporting disk 5, somewhat less in diameter than the diameter of the disks 3 and arranged in spaced parallel relation with the wheels 1.

Secured upon each of the disks 5 is the automatic operating mechanism consisting in a series of duplicate devices, a brief description of one of which is as follows: Pivotally secured upon the periphery of the disk 5 is an approximately L-shaped lever 6, pivoted at the juncture of its arms in ears radiating from the disk, the free end of that arm of the lever projected toward the wheel 1 being connected by a link 7 to the flange 8 of said wheel 1, the connection being preferably through the medium of a screw bolt 9, as shown in Fig. 4. The free end of the remaining arm of the L-shaped lever 6 is connected through a link 10 to one end of a rod 11, the opposite end of which is slidably mounted in an opening 12 in the adjacent disk 3. The rod 11 at the end connected with the link 10 is provided with a disk or collar 13, to which is secured one end of a coil spring 14, the opposite end of said spring being secured to the adjacent disk 3. The spring encircles the rod 11 and is normally distended or under tension when the parts are in set or inoperative position. It will be noted that the L-shaped lever 6 and the crank 7 are of such proportions and so arranged that when said link is connected to the wheel flange the rod 11 is normally withdrawn so as to maintain but a comparatively short length thereof projected beyond the relatively inner surface of the disk 3, and that with the parts in this position the spring 14 is normally distended, thereby maintaining said rod under tension of the spring.

Each disk 3 is provided with a series of pins 11, which may be in any desired number, each set of pins being, of course, connected with the flange 8 of the adjacent car wheel. When thus arranged the pins 11, projecting beyond the inner face of each disk 3, present a series of projections arranged in concentric relation with the axle and beyond the rods 4, as will be plain from Fig. 2.

15 represents a pipe depending from the train pipe in open communication therewith, said pipe being provided at its lower terminal with a valve 16 controlled by a handle 17, the free end of which depends between the disks 3 and terminates just above the path of movement of the rods 4. As the pins 11 are normally withdrawn it will be understood that the handle 17 of the valve is arranged between the proximate ends of transversely alined pins, and that said handle is in the path of said pins when in projected or operative positions.

With the parts constructed and arranged as described the operation of my improved automatic brake setting mechanism is as follows: The valve 16 is normally closed in which position the handle 17 is arranged between the disks 3, as shown in Fig. 1. Upon breaking of the flange of either wheel one or the other of the links 7 is released from connection with said flange, permitting the relatively outer end of the lever 6 to drop and allowing the spring 14 to force the particular pin inward, thereby arranging its free end in the path of the handle 17. As said projected portion of the pin engages the handle it will turn the same with the effect to open the valve 16 and bleed the train line, thereby setting the brakes. If for any reason the axle 2 should become bent it will result in displacing one or the other of the rods 4, with the effect to dispose the same in the path of the handle 17. This will tend to engage the handle and open the valve and set the brakes. The brakes may thus be automatically set upon bending of the axle or breaking of either wheel flange, it being understood that each of the axles throughout the length of the train are provided with mechanism similar to that described. As the setting of the brakes is practically simultaneous with the breaking of the flange or bending of the axle it is obvious that the train will be brought to a stop in time to prevent an accident or to relieve the same of serious consequences.

Having thus described the invention what is claimed as new, is:—

1. In combination, a car wheel, a valve connected with the air pipe system of the car, and means for operating said valve normally held inoperative by the wheel flange.

2. In combination, a car truck, an air release valve connected with the air brake system on the car; means for detecting broken wheel flanges, and devices controlled by said detector means for opening the valve when the detector finds a broken flange, substantially as described.

3. The combination with a train pipe and a bleed valve therefor, of means carried by and movable with the axle, said means being normally disposed beyond valve influencing position and being adapted upon the bending of the axle to be projected into valve influencing position to open said valve.

4. The combination with a train pipe and a bleed valve therefor, of a rod arranged to be connected to the wheel flange and normally held beyond the path of the valve, and means for projecting said rod into the path of the valve upon the breaking of the wheel flange.

5. The combination with a bleed valve for a train pipe, of a series of rods carried by the axle, means for normally holding said rods withdrawn from influencing the valve, and means for projecting said rods into position to influence the valve.

6. The combination with a train pipe bleed valve arranged above the car axle, of a disk secured upon said axle, a series of pins movably mounted in said disks, connections between said pins and the flange of the car wheel, said connections being arranged to normally hold the pins in a position to avoid affecting the valve, and springs for projecting said pins into valve influencing position upon the breakage of the flange.

7. The combination with a train pipe bleed valve disposed above the car axle, of spaced disks secured upon the axle, and rods connecting said disks, said rods being normally disposed beyond valve influencing position and being adapted to be projected into valve influencing position upon the bending of the axle.

8. The combination with a train pipe bleed valve disposed above the car axle, of spaced disks secured upon the axle, and rods connecting said disks, said rods being arranged in concentric relation with the axle and normally disposed beyond valve influencing position and being adapted to be projected into valve influencing position upon the bending of the axle.

In testimony whereof, I affix my signature in presence of two witnesses.

PATRICK MUSSLEMAN.

Witnesses:
 GUY PERRY,
 GUY BROWN.